US008517407B2

(12) United States Patent
Handa et al.

(10) Patent No.: US 8,517,407 B2
(45) Date of Patent: Aug. 27, 2013

(54) THREE-WHEEL PEDAL-STYLE WHEELCHAIR

(75) Inventors: Yasunobu Handa, Sendai (JP); Kenji Suzuki, Sendai (JP)

(73) Assignees: Yasunobu Handa, Miyagi (JP); TESS Co., Ltd, Miyagi (JP)

( * ) Notice: Subject to any disclaimer, the term of this patent is extended or adjusted under 35 U.S.C. 154(b) by 0 days.

(21) Appl. No.: 13/450,483

(22) Filed: Apr. 19, 2012

(65) Prior Publication Data

US 2012/0267175 A1 Oct. 25, 2012

(30) Foreign Application Priority Data

Apr. 22, 2011 (JP) ................................ 2011-096463

(51) Int. Cl.
*B62K 5/02* (2013.01)
*A61G 5/02* (2006.01)

(52) U.S. Cl.
CPC .................................... *A61G 5/023* (2013.01)
USPC ........................................................ 280/282

(58) Field of Classification Search
USPC ................ 180/6.2, 6.32, 6.34, 907; 280/250, 280/250.1
See application file for complete search history.

(56) References Cited

U.S. PATENT DOCUMENTS 4,846,461 A * 7/1989 Robards et al. ................ 482/72
5,848,658 A * 12/1998 Pulver .......................... 180/65.1
7,066,480 B2 * 6/2006 Brichet et al. ................ 280/234

* cited by examiner

*Primary Examiner* — J. Allen Shriver, II
*Assistant Examiner* — Felicia L Brittman
(74) *Attorney, Agent, or Firm* — Leong C. Lei

(57) ABSTRACT

A three-wheel pedal-style wheelchair which includes a roller at a side, close to the ground, of the wheelchair, wherein the roller prevents the wheelchair from turning over, a steering wheel arranged at a side of the wheelchair, and two front wheels respectively arranged at two opposite sides of the wheelchair, wherein the two front wheels comprises a driving wheel led to rotate forward or backward by a user stepping and a loose wheel, wherein when the wheelchair turns to a direction in a small radius, the steering wheel is considerably rotated to a direction and the driving wheel is rotated forward, wherein when the wheelchair turns to another direction, the steering wheel is considerably rotated to a direction and the driving wheel is rotated backward. Accordingly, the wheelchair is easily controlled to have a small turn, like whirling in one spot, to move and to turn safely.

9 Claims, 7 Drawing Sheets

THREE-WHEEL PEDAL-STYLE WHEELCHAIR

BACKGROUND OF THE DISCLOSURE a) Field of the Disclosure

The invention relates to a pedal-style wheelchair, and more particularly, to a three-wheel pedal-style wheelchair that is easily controlled to have a small turn, like whirling in one spot, to move and to turn safely, and is so small as to be readily got on or off.

b) Brief Description of the Related Art

Multiple of the foot impaired moves using wheelchairs. Most of the wheelchairs are controlled to go forward and backward and turn using hands to rotate wheels. Electric wheelchairs driven by motors are also popular and often seen in streets. However, these wheelchairs are not driven by feet and leads feet of the older or the foot impaired due to injury or sick to be even weaker than ever.

Recently, pedal-style wheelchairs are developed and have excellent effects on rehabilitation of the foot impaired using the pedal-style wheelchairs. For a handicap with hemiplegia caused by brain disabilities, when his or her dual ankles are fixed on pedals on a pedal-style crank free to rotate, the wheelchairs can go forward by the dual feet stepping. For an apoplectic person suffering from hemiplegia of upper and lower limbs at one side, a healthy lower limb not only can step, but a hemiplegic lower limb also can step with cooperation of the healthy lower limb. The pedal-style wheelchair can move in a long distance as fast as an adult marches and can be used by an apoplectic person suffering from hemiplegia with from slight to extremely severe movement disability only if joints or other movable parts are not obviously uncomfortable or have pain. Besides, another person finding it hard to move about due to other illnesses or injuries can use the wheelchair. Accordingly, the pedal-style wheelchair can improve weakened strength and palsy of legs. However, the wheelchair is not small enough and has a large radius of gyration such that the wheelchair is not convenient to be used in a ward occupied by relatively many beds and limited to a large expanse for rehabilitation. In order to be used in daily life, the wheelchair should have a small radius of gyration so as to be capable of turning in an elevator or another limited space.

SUMMARY OF THE DISCLOSURE

In order to improve the above disadvantages, inventor collected related information, had evaluation and consideration in many ways based on long experience on this field and straight did tests and modification, and finally a three-wheel pedal-style wheelchair can be developed to be easily controlled to have a small turn, like whirling in one spot, to move and to turn safely, and to be so small as to be readily got on or off.

In accordance with an objective of the present invention, a three-wheel pedal-style wheelchair can be realized with a small turn, like whirling in one spot.

In accordance with an objective of the present invention, a three-wheel pedal-style wheelchair can be realized to be readily got on or off and prevented from turning over.

In order to achieve the above objectives, a pedal-style wheelchair, in accordance with the present invention, includes a steering wheel at a side thereof and two opposite front wheels at two sides thereof. The two front wheels comprise a driving wheel led to rotate forward or backward by a user stepping, and a loose wheel. When the wheelchair turns in a small turn of 180 degrees, the steering wheel is considerably rotated to a direction and the driving wheel is rolled forward. When the wheelchair turns to another direction, the steering wheel is considerably rotated to a direction and the driving wheel is rolled backward.

In an embodiment, the main structure further comprises at least a roller at a side, close to the ground, of the pedal-style wheelchair, wherein the roller prevents the pedal-style wheelchair from turning over.

In an embodiment, the main structure further comprises at least a pedal configured to be stepped by the user, wherein the pedal comprises a planar foot-placing portion, a front foot-placing portion expanding forward from a side of the foot-placing portion, a base portion provided at a side of the foot-placing portion and with mounting holes, a heel-placing portion at a side, far away from the front foot-placing portion, of the foot-placing portion, and a foot strip provided with a hook-and-loop fastener.

The wheelchair has a steering structure for a steering function, comprising a support device, a bifurcate arm arranged on the support device, a longitudinal operating rod arranged on the bifurcate arm and a lateral operating arm arranged on the bifurcate arm. The longitudinal operating rod and lateral operating arm capable of rotating horizontally together connect with an operating plate such that a rotation of the longitudinal operating rod and lateral operating arm can be transmitted to the operating plate. The operating plate is arranged with a pair of steel cables connecting to a back-wheel support shaft at a back-wheel support portion, wherein the back-wheel support shaft connects with the steering wheel. A rotary force of the steel cables can be multiplied and transmitted to the back-wheel support shaft such that the steering wheel can be controlled to turn left or right.

The back-wheel support portion is arranged with at least a caliper, the longitudinal operating rod is arranged with at least a brake rod, and the steering wheel is arranged with a disk. The brake rod when being held leads the steel cables to tighten the caliper. A position and inclined degree of the caliper can be controlled to lead a brake force created in backward movement to be greater than that created in forward movement.

The wheelchair is provided with a motor for supplying auxiliary power to the driving wheel when the wheelchair turns in a small radius.

In accordance with the present invention, the pedal-style wheelchair includes the steering wheel at a side thereof and the two opposite front wheels at two sides thereof. The front wheels comprise the driving wheel and the loose wheel such that the pedal-style wheelchair is small and comfortable to be taken for a seat and has a small turn, like whirling in one spot. Besides, the pedal-style wheelchair is provided with devices at left and right sides thereof to prevent the pedal-style wheelchair from turning over. A roller supporting body arranged at a side of the pedal-style wheelchair only can move backward so as to prevent the pedal-style wheelchair from falling forward. The roller supporting body tilts to secure the user when the pedal-style wheelchair moves over a rugged place. The pedal comprises the planar foot-placing portion, the front foot-placing portion expanding forward from a side of the foot-placing portion, the base portion provided at a side of the foot-placing portion and with mounting holes, the heel-placing portion at a side, far away from the front foot-placing portion, of the foot-placing portion, and the foot strip. Thereby, the pedal is suitable for a foot with various sizes and comfortably and safely stepped by a user. A handbrake rod easily controlled by a single hand is mounted on the longitudinal operating rod. The brake rod is mounted on the longitudinal operating rod and thus can be held in a natural motion.

The brake rod when being held leads the steel cables to tighten the caliper. The brake rod is connected to the caliper mounted on the back-wheel support portion via the steel cables and leads the steel cables to tighten the caliper so as to apply a brake force to the disk arranged on the steering wheel, wherein a position and inclined degree of the caliper can be controlled to lead the brake force created in backward movement to be greater than that created in forward movement. Accordingly, the pedal-style wheelchair can be safely used over an inclined road. The brake rod can be locked in a brake position such that the wheelchair can be braked and prevented from fluttering when being got on or off. The motor supplies auxiliary power to the driving wheel, and thus a loading of a user stepping when the wheelchair turns in a small radius can be reduced.

In accordance with the present invention, the pedal-style wheelchair includes a framework composed of a basic frame portion and a side frame portion, wherein the framework is supported by the front wheels at two sides thereof. The two front wheels comprise a loose wheel at a side thereof and a driving wheel at the other side thereof. A rotation of a pedal crank mounted on the basic frame portion can be delivered to the driving wheel led to move forward or backward in coordinate with steering the steering wheel such that the wheelchair can turn in a small radius.

In an embodiment, the pedal-style wheelchair includes a framework composed of a basic frame portion and a side frame portion, wherein the framework is supported by the front wheels at two sides thereof. The two front wheels comprise a loose wheel at a side thereof and a driving wheel at the other side thereof. A rotation of a pedal crank mounted on the basic frame portion can be delivered to the driving wheel led to move forward or backward in coordinate with steering the steering wheel such that the wheelchair can turn in a small radius. A space between a pair of the side frame portion arranged on the basic frame portion can be adjusted.

In an embodiment, the pedal crank free to rotate is mounted on a front end of a main frame extending forward and backward. A bottom connecting tube arranged outward at a back side of the main frame, and the back-wheel support portion extending upward and downward is mounted on a back end of the main frame. A lateral rod has a side connecting with a central portion of the main frame. These parts compose the basic frame portion. A side frame has two ends with top and bottom sides joining a side stem composed of a straight portion, a seat portion and a backrest portion. A joint portion joining the side frame and the side stem is close to a top side of the side stem and extends sideward down to a bottom tube. These parts compose the side frame portion. The basic frame portion and the side frame portion at two sides of the pedal-style wheelchair are supported by the side frame supported by the lateral rod, wherein a position of the side frame can be adjusted. The bottom tube is inserted into and supported by the bottom connecting tube, wherein a position of the bottom tube can be adjusted. These parts compose the framework. The loose wheel can be adjusted to an outside in an axial direction and supported by the side frame. A driving shaft is fixed on the main frame and can be adjusted to the other side in the axial direction. A hoist-type transmission device leads the pedal crank and the driving shaft to have a transmission relationship. The steering wheel is supported by the back-wheel support portion and the back-wheel support shaft of the back-wheel support portion, and thus can be steered. A telescopic spring is arranged between the back-wheel support portion and the main frame.

In an embodiment, the pedal crank free to rotate is mounted on a front end of a main frame extending forward and backward. The bottom connecting tube arranged outward at a back side of the main frame, and the back-wheel support portion extending upward and downward is mounted on a back end of the main frame. The lateral rod has a side connecting with a central portion of the main frame. These parts compose the basic frame portion. The side frame has two ends with top and bottom sides joining the side stem composed of the straight portion, the seat portion and the backrest portion. The joint portion joining the side frame and the side stem is close to a top side of the side stem and extends sideward down to the bottom tube at an inner side of the pedal-style wheelchair. These parts compose the side frame portion. The basic frame portion and the side frame portion at two sides of the pedal-style wheelchair are supported by the side frame supported by the lateral rod, wherein a position of the side frame can be adjusted. The bottom tube is inserted into and supported by the bottom connecting tube, wherein a position of the bottom tube can be adjusted. These parts compose the framework. The loose wheel can be adjusted to an outside in an axial direction and supported by the side frame. A driving shaft is fixed on the main frame and can be adjusted to the other side in the axial direction. A hoist-type transmission device leads the pedal crank and the driving shaft to have a transmission relationship. The steering wheel is supported by the back-wheel support portion and the back-wheel support shaft of the back-wheel support portion, and thus can be steered. The telescopic spring is arranged between the back-wheel support portion and the main frame. An armrest arranged at the side stem at two sides of the pedal-style wheelchair can move backward based on demand. The bifurcate arm is arranged on the detachable support device arranged at a side of the side stem. The bifurcate arm is arranged with the longitudinal operating rod and the lateral operating arm that compose a structure capable of rotating horizontally. A rotation of the longitudinal operating rod and lateral operating arm can be transmitted to the operating plate. The pair of steel cables arranged on the operating plate can transmit a multiplied rotary force to the back-wheel support shaft joining the back-wheel support portion such that the steering wheel can be controlled to turn left or right. Ball-shaped caster wheels are fixed at the side frames at left and right sides of the pedal-style wheelchair and at a front end of a rod, preventing the pedal-style wheelchair from turning over, arranged at the bottom tube. A supporting body is mounted at a front side of the main frame and tilts when a compressing spring moves backward. A supporting roller is arranged at an end of the supporting body. The pedal configured to be stepped by the user is mounted on the pedal crank and can be free to rotate, wherein the pedal comprises the planar foot-placing portion, the front foot-placing portion expanding forward from a side of the foot-placing portion, the base portion provided with mounting holes, and a structure for mounting the foot strip. The seat portion and backrest portion are composed of multiple windable strips having a hook-and-loop fastener with a specific length.

In an embodiment, the pedal crank free to rotate is mounted on a front end of a main frame extending forward and backward. The bottom connecting tube arranged outward at a back side of the main frame, and the back-wheel support portion extending upward and downward is mounted on a back end of the main frame. The lateral rod has a side connecting with a central portion of the main frame. These parts compose the basic frame portion. The side frame has two ends with top and bottom sides joining the side stem composed of the straight portion, the seat portion and the backrest portion. The joint portion joining the side frame and the side stem is close to a top side of the side stem and extends sideward down to the bottom tube at an inner side of the pedal-style wheelchair. These parts compose the side frame portion. The basic frame portion and the side frame portion at two sides of the pedal-style wheelchair are supported by the side frame supported by the lateral rod, wherein a position of the side frame can be adjusted. The bottom tube is inserted into and supported by the bottom connecting tube, wherein a position of the bottom tube can be adjusted. These parts compose the framework. The loose wheel can be adjusted to an outside in an axial direction and supported by the side frame. The driving shaft is fixed on the main frame and can be adjusted to the other side in the axial direction. The hoist-type transmission device leads the pedal crank and the driving shaft to have a transmission relationship. The steering wheel is supported by the back-wheel support portion and the back-wheel support shaft of the back-wheel support portion, and thus can be steered. The telescopic spring is arranged between the back-wheel support portion and the main frame. The armrest arranged at the side stem at two sides of the pedal-style wheelchair can move backward based on demand. The bifurcate arm is arranged on the detachable support device arranged at a side of the side stem. The bifurcate arm is arranged with the longitudinal operating rod and the lateral operating arm that compose a structure capable of rotating horizontally. A rotation of the longitudinal operating rod and lateral operating arm can be delivered to the operating plate. The pair of steel cables arranged on the operating plate can transmit a multiplied rotary force to the back-wheel support shaft joining the back-wheel support portion such that the steering wheel can be controlled to turn left or right. The ball-shaped caster wheels are fixed at the side frames at left and right sides of the pedal-style wheelchair and at a front end of the rod, preventing the pedal-style wheelchair from turning over, arranged at the bottom tube. The supporting body is mounted at a front side of the main frame and tilts when a compressing spring moves backward. The supporting roller is arranged at an end of the supporting body. The pedal configured to be stepped by the user is mounted on the pedal crank and can be free to rotate, wherein the pedal comprises the planar foot-placing portion, the front foot-placing portion expanding forward from a side of the foot-placing portion, the base portion provided with mounting holes, the heel-placing portion at a back side of the foot-placing portion, and the structure for mounting the foot strip. The seat portion and backrest portion are composed of multiple windable strips having a hook-and-loop fastener with a specific length. The brake rod is arranged on the longitudinal operating rod. The brake rod is connected to the caliper mounted on the back-wheel support portion via the steel cables and leads the steel cables to tighten the caliper so as to apply a brake force to the disk arranged on the steering wheel.

In an embodiment, the pedal crank free to rotate is mounted on a front end of a main frame extending forward and backward. The bottom connecting tube arranged outward at a back side of the main frame, and the back-wheel support portion extending upward and downward is mounted on a back end of the main frame. The lateral rod has a side connecting with a central portion of the main frame. These parts compose the basic frame portion. The side frame has two ends with top and bottom sides joining the side stem composed of the straight portion, the seat portion and the backrest portion. The joint portion joining the side frame and the side stem is close to a top side of the side stern and extends sideward down to the bottom tube at an inner side of the pedal-style wheelchair. These parts compose the side frame portion. The basic frame portion and the side frame portion at two sides of the pedal-style wheelchair are supported by the side frame supported by the lateral rod, wherein a position of the side frame can be adjusted. The bottom tube is inserted into and supported by the bottom connecting tube, wherein a position of the bottom tube can be adjusted. These parts compose the framework. The loose wheel can be adjusted to an outside in an axial direction and supported by the side frame. The driving shaft is fixed on the main frame and can be adjusted to the other side in the axial direction. The hoist-type transmission device leads the pedal crank and the driving shaft to have a transmission relationship. The steering wheel is supported by the back-wheel support portion and the back-wheel support shaft of the back-wheel support portion, and thus can be steered. The telescopic spring is arranged between the back-wheel support portion and the main frame. The armrest arranged at the side stem at two sides of the pedal-style wheelchair can move backward based on demand. The bifurcate arm is arranged on the detachable support device arranged at a side of the side stem. The bifurcate aim is arranged with the longitudinal operating rod and the lateral operating arm that compose a structure capable of rotating horizontally. A rotation of the longitudinal operating rod and lateral operating aim can be transmitted to the operating plate. The pair of steel cables arranged on the operating plate can transmit a multiplied rotary force to the back-wheel support shaft joining the back-wheel support portion such that the steering wheel can be controlled to turn left or right. The ball-shaped caster wheels are fixed at the side frames at left and right sides of the pedal-style wheelchair and at a front end of the rod, preventing the pedal-style wheelchair from turning over, arranged at the bottom tube. The supporting body is mounted at a front side of the main frame and tilts when a compressing spring moves backward. The supporting roller is arranged at an end of the supporting body. The pedal configured to be stepped by the user is mounted on the pedal crank and can be free to rotate, wherein the pedal comprises the planar foot-placing portion, the front foot-placing portion expanding forward from a side of the foot-placing portion, the base portion provided with mounting holes, the heel-placing portion at a back side of the foot-placing portion, and the structure for mounting the foot strip. The seat portion and backrest portion are composed of multiple windable strips having a hook-and-loop fastener with a specific length. The brake rod is arranged on the longitudinal operating rod. The brake rod is connected to the caliper mounted on the back-wheel support portion via the steel cables and leads the steel cables to tighten the caliper so as to apply a brake force to the disk arranged on the steering wheel. A position and inclined degree of the caliper can be controlled to lead a brake force created in backward movement to be greater than that created in forward movement.

In an embodiment, the pedal crank free to rotate is mounted on a front end of a main frame extending forward and backward. The bottom connecting tube arranged outward at a back side of the main frame, and the back-wheel support portion extending upward and downward is mounted on a back end of the main frame. The lateral rod has a side connecting with a central portion of the main frame. These parts compose the basic frame portion. The side frame has two ends with top and bottom sides joining the side stem composed of the straight portion, the seat portion and the backrest portion. The joint portion joining the side frame and the side stem is close to a top side of the side stem and extends sideward down to the bottom tube at an inner side of the pedal-style wheelchair. These parts compose the side frame portion. The basic frame portion and the side frame portion at two sides of the pedal-style wheelchair are supported by the side frame supported by the lateral rod, wherein a position of the side frame can be adjusted. The bottom tube is inserted into and supported by the bottom connecting tube, wherein a position of the bottom tube can be adjusted. These parts compose the mainframe. The loose wheel can be adjusted to an outside in an axial direction and supported by the side frame. The driving shaft is fixed on the main frame and can be adjusted to the other side in the axial direction. The hoist-type transmission device leads the pedal crank and the driving shaft to have a transmission relationship. The steering wheel is supported by the back-wheel support portion and the back-wheel support shaft of the back-wheel support portion, and thus can be steered. The telescopic spring is arranged between the back-wheel support portion and the main frame. The armrest arranged at the side stem at two sides of the pedal-style wheelchair can move backward based on demand. The bifurcate arm is arranged on the detachable support device arranged at a side of the side stem. The bifurcate arm is arranged with the longitudinal operating rod and the lateral operating arm that compose a structure capable of rotating horizontally. A rotation of the longitudinal operating rod and lateral operating arm can be transmitted to the operating plate. The pair of steel cables arranged on the operating plate can transmit a multiplied rotary force to the back-wheel support shaft joining the back-wheel support portion such that the steering wheel can be controlled to turn left or right. The ball-shaped caster wheels are fixed at the side frames at left and right sides of the pedal-style wheelchair and at a front end of the rod, preventing the pedal-style wheelchair from turning over, arranged at the bottom tube. The supporting body is mounted at a front side of the main frame and tilts when a compressing spring moves backward. The supporting roller is arranged at an end of the supporting body. The pedal configured to be stepped by the user is mounted on the pedal crank and can be free to rotate, wherein the pedal comprises the planar foot-placing portion, the front foot-placing portion expanding forward from a side of the foot-placing portion, the base portion provided with mounting holes, the heel-placing portion at a back side of the foot-placing portion, and the structure for mounting the foot strip. The seat portion and backrest portion are composed of multiple windable strips having a hook-and-loop fastener with a specific length. The brake rod is arranged on the longitudinal operating rod. The brake rod is connected to the caliper mounted on the back-wheel support portion via the steel cables and leads the steel cables to tighten the caliper so as to apply a brake force to the disk arranged on the steering wheel. A position and inclined degree of the caliper can be controlled to lead a brake force created in backward movement to be greater than that created in forward movement. The brake rod can be locked in a brake position.

In an embodiment, the three-wheel pedal-style wheelchair is provided with the motor for supplying auxiliary power to the driving wheel when the three-wheel pedal-style wheelchair turns in a small radius.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

Figure 1:
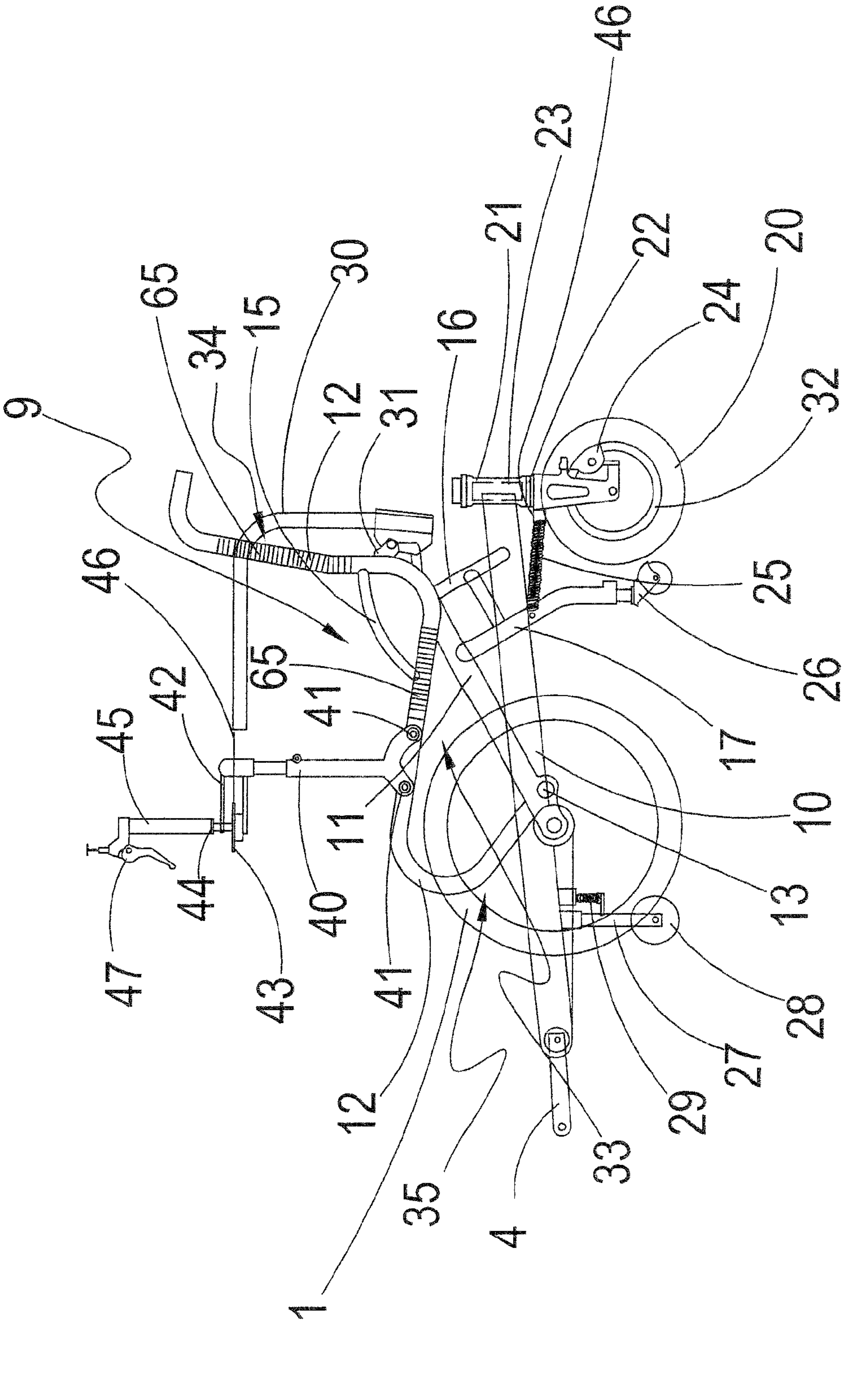
FIG. 1 is a schematically side view in accordance with an embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

Figure 2:
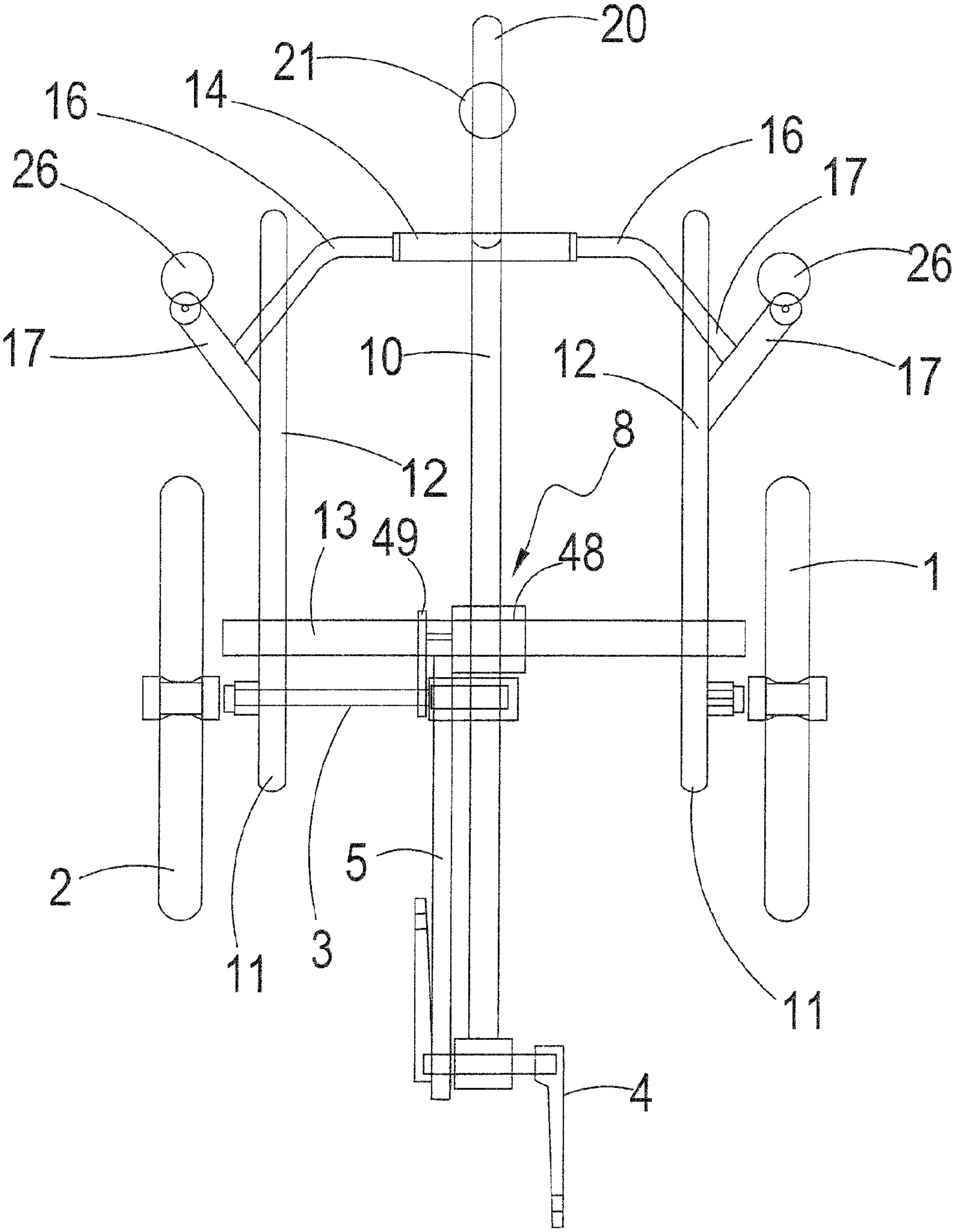
FIG. 2 is a schematically top view in accordance with an embodiment of the present invention.
Figure 3:
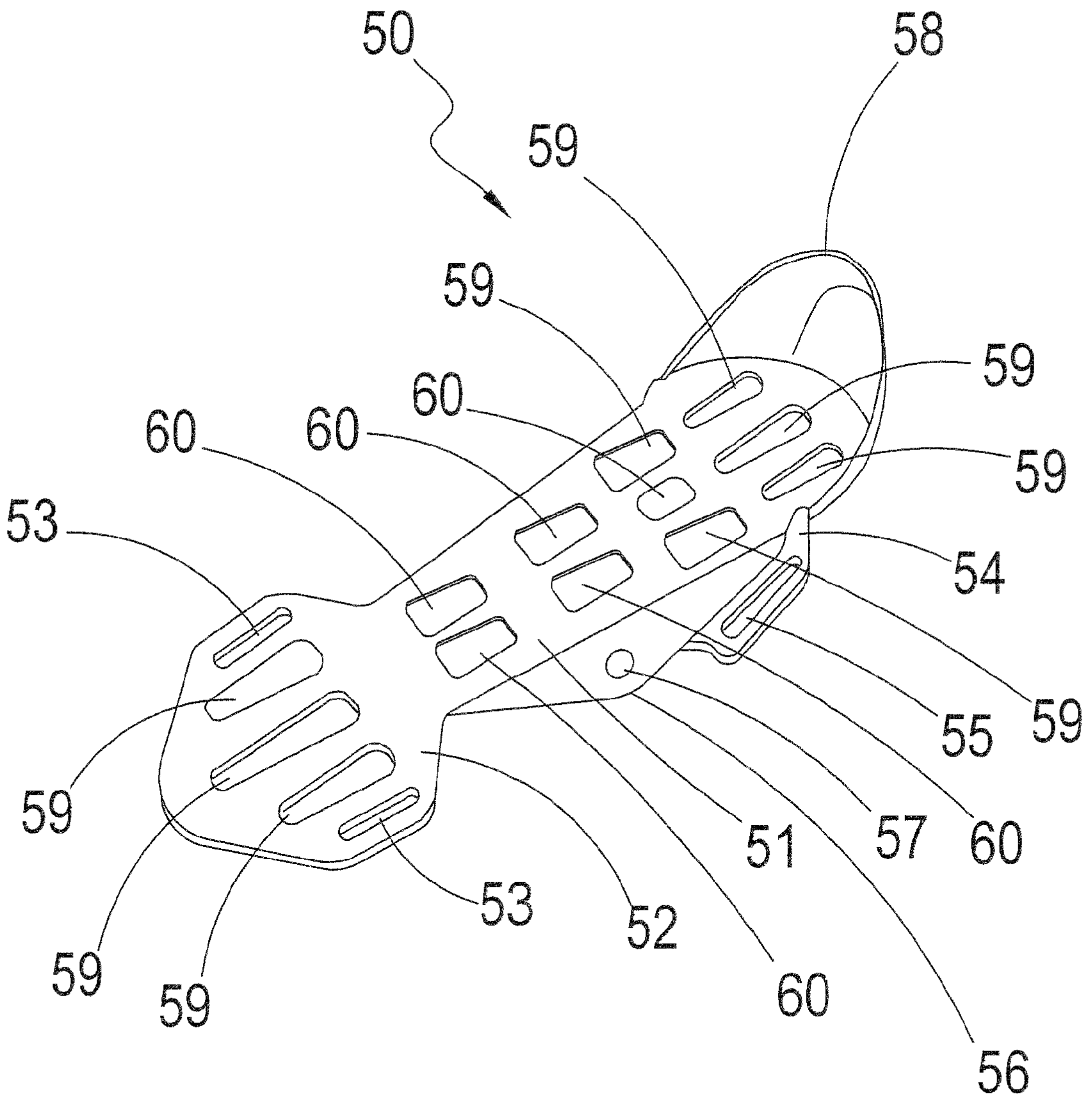
FIG. 3 is a schematic view of a pedal in accordance with an embodiment of the present invention.
Figure 4:
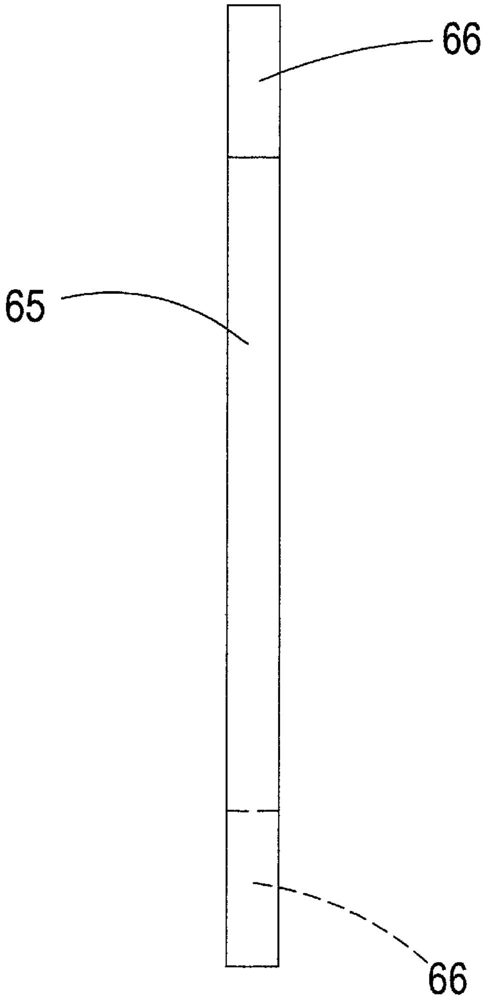
FIG. 4 is a schematic view of a strip in accordance with an embodiment of the present invention.

FIG. 1 is a schematically side view in accordance with an embodiment of the present invention. FIG. 2 is a schematically top view in accordance with an embodiment of the present invention. FIG. 3 is a schematic view of a pedal in accordance with an embodiment of the present invention. FIG. 4 is a schematic view of a strip in accordance with an embodiment of the present invention. Referring to FIGS. 1-4, in accordance with the present invention, a three-wheel pedal-style wheel chair includes a basic frame portion 8 composed of a main frame 10 extending forward and backward, a pedal crank 4 free to rotate mounted on a front end of the main frame 10 extending forward and backward, a bottom connecting tube 14 arranged outward at a back side of the main frame 10, a back-wheel support portion 22 extending upward and downward and mounted on a back end of the main frame 10 and a lateral rod having a side connecting with a central portion of the main frame 10. The three-wheel pedal-style wheel chair includes a side frame portion 9 composed of a side stem 12 composed of a straight portion 35, a seat portion 33 and a backrest portion 34, a side frame 11 having two ends with top and bottom sides joining the side stem 12, a strengthening rod 15 joining two ends of the side stem 12, and a bottom tube 16 at an inner side of the pedal-style wheelchair, wherein the joint portion joining the side frame 11 and the side stem 12 is close to a top side of the side stem 12 and extends sideward down to the bottom tube 16. The basic frame portion 8 and the side frame portion 9 at two sides of the pedal-style wheelchair are supported by the side frame 11 supported by a lateral rod 13, wherein a position of the side frame 11 can be adjusted, so as to form a framework of the wheelchair. A space between a pair of the side frame portions 9 arranged on the basic frame portion 8 can be adjusted based on a physique of a user.

A front wheel mounted to the side frame 11 is a loose wheel 1 that can be adjusted to an outside in an axial direction and supported by the side frame 11. When a seat has a width to be changed, the loose wheel 1 can be adjusted in the axial direction without any change of a width between the two front wheels. A driving shaft 3 is fixed on the main frame 10 and can be adjusted to the other side in the axial direction. The front wheel mounted on a front end of the driving shaft 3 is a driving wheel 2. In this embodiment, the left front wheel is the loose wheel 1, and the right front wheel is the driving wheel 2. Alternatively, the left front wheel can be designed as the driving wheel 2, and the right front wheel is designed as the loose wheel 1. The loose wheel 1 and driving wheel 2 are an embodiment, and the present invention should not be limited thereto. A hoist-type transmission device 5 leads the pedal crank 4 and the driving shaft 3 to have a transmission relationship. Thereby, the pedal crank 4 leads the driving wheel 2 to rotate and move forward. A motor 48 mounted on the main frame 10 can supply auxiliary rotation power transmitted by a hoist-type transmission device 49 and the driving shaft 3 to the driving wheel 2 when the wheelchair turns in a small radius. The motor 48 can be a DC forward/reverse motor because a steering angle of the wheelchair can be detected and the auxiliary power can be transmitted to the driving wheel 2. A steering wheel 20 is supported by the back-wheel support portion 22 and a back-wheel support shaft 23 of the back-wheel support portion 22, and thus can be steered. A telescopic spring 25 arranged between a top side of the back-wheel support portion 22 and the main frame 10 forces the steering wheel 20 to return to a center position so as to ensure the wheelchair to move forward straight.

The side stem 12 at two sides of the wheelchair is arranged with an armrest 30, and an armrest assembling portion 31 is provided between the side stem 12 and the armrest 30. The armrest assembling portion 31 can be moved backward to be assembled based on demand. The wheelchair when being used can be set in a general type. When a use gets on or off the wheelchair, the armrest 30 can swing backward and thus does not hinder a handicap from getting on or off the wheelchair from a side thereof. Accordingly, the wheelchair is comfortable to be got on or off.

The side stem 12 is assembled with a support device 40 fixed by a fixing portion 41. A rotary operating plate 43 is positioned in a bifurcate arm 42 arranged over the support device 40 and connects with a longitudinal operating rod 45 and a lateral operating arm 44. A rotation of the longitudinal operating rod 45 and lateral operating arm 44 can be directly transmitted to the operating plate 43. A pair of left and right steel cables 46 arranged on the operating plate 43 can transmit a rotary force of the operating plate 43 to a back-wheel support shaft 23 joining the back-wheel support portion 22. The operating plate 43 has a larger diameter than that of the back-wheel support shaft 23, and thus the rotary force of the operating plate 43 can be multiplied and transmitted to the back-wheel support shaft 23 such that the steering wheel 20 can be easily controlled to turn left or right. The steering wheel 20 can rotate to about 90 degrees and an operating device for steering can be mounted on the lateral rod 13. Thereby, the steering wheel 20 can be controlled using a single hand. Besides, the operating device for steering can be assembled on a left or right side of the lateral rod 13, and thus can be operated by a use with left or right hemiplegia.

The left and right side frames 11 and left and right bottom tubes 16 are arranged with rods 17 for preventing the wheelchair from turning over. Ball-shaped caster wheels 26 for preventing the wheelchair from turning over to the left or right side are arranged at front ends of the rods 17. Roller supporting bodies 27 provided with rollers 28 are mounted at a front side of the main frame 10 and tilts when a compressing spring 29 moves backward. Thereby, the wheelchair when tilting forward can be supported and secured to be prevented from turning over. The above parts compose a device for preventing the wheelchair from turning over. The roller supporting bodies 27 and rollers 28 tilt backward when the wheelchair moves over a rugged place. Accordingly, the wheelchair can smoothly move over a rugged place.

Screws can be used to mount a pedal 50 on the pedal crank 4 such that the pedal 50 can be free to rotate. The pedal comprises a planar foot-placing portion 51, a front foot-placing portion 52 expanding forward from a side of the foot-placing portion 51, a base portion 56 provided with mounting holes 57, a heel-placing portion 58 at a back side of the foot-placing portion 51. Front foot-strip holes 53 pass through two sides of the front foot-placing portion 52. The base portion 56 extends sideward and downward to from protrusion portions 54, and foot-strip holes 55 pass through the protrusion portion 54. The foot-placing portion 51, front foot-placing portion 52 and heel-placing portion 58 are provided with skidproof holes 59 and shallow cavities 60, and thus the pedal 50 can be lightened. When a foot of a user is put on the foot-placing portion 51, front foot-placing portion 52 and heel-placing portion 58, a foot strip (not shown) with a hook-and-loop fastener can be mounted to the front foot-strip holes 53 at two sides and the back foot-strip holes 55 at the protrusion portions 54 at two sides such that the foot of the uses can be secured to be fixed on the foot-placing portion 51 and front foot-placing portion 52.

The seat portion 33 and backrest portion 34 wound with a strip 65 form a seat and backrest. The strip 65 has two ends with reverse surfaces arranged with a hook-and-loop fastener 66. Thereby, the strip 65 has a winding length that can be adjusted. An altitude of the seat can be adjusted and the backrest can be adjusted to move forward or backward.

A brake rod 47 is arranged on the longitudinal operating rod 45. The brake rod 47 is connected to a caliper 24 mounted on the back-wheel support portion 22 via the steel cables 46 and leads the steel cables 46 to tighten the caliper 24 so as to apply a brake force to a disk 32 arranged on the steering wheel 20. A position and inclined degree of the caliper 24 can be controlled to lead a brake force created in backward movement to be greater than that created in forward movement. In order to lock the brake rod 47 in a brake position, a locking pin and braking pin (not shown) are provided. Accordingly, the wheelchair can be locked using the locking pin and braking pin and thus can be prevented from fluttering when being got on or off.

Figure 5:
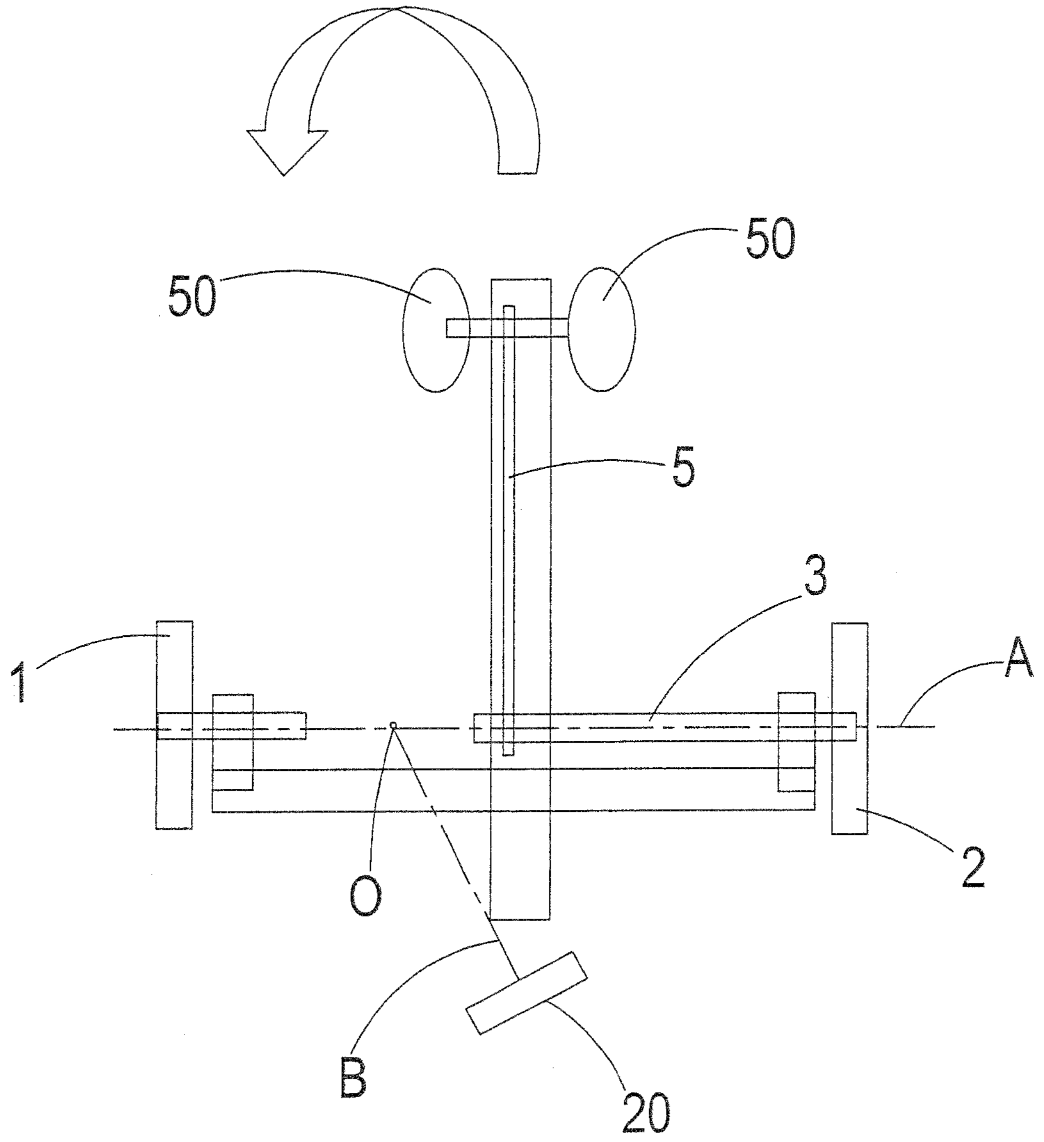
FIG. 5 is a schematic view of an action of turning left in accordance with an embodiment of the present invention.

FIG. 1 is a schematically side view in accordance with an embodiment of the present invention. FIG. 2 is a schematically top view in accordance with an embodiment of the present invention. FIG. 3 is a schematic view of a pedal in accordance with an embodiment of the present invention. FIG. 4 is a schematic view of a strip in accordance with an embodiment of the present invention. FIG. 5 is a schematic view of an action of turning left in accordance with an embodiment of the present invention. Referring to FIG. 1-5, the hoist-type transmission device 5 can transmit a rotary force applied onto the pedal 50 to the driving wheel 2 via the driving shaft 3. The driving wheel 2 and the loose wheel 1 coaxial with the driving wheel 2 compose a pair of the front wheels. The back wheel, that is, the steering wheel 20 controls the wheelchair to turn left or right. For explanation, in this embodiment, the front right wheel is defined as the driving wheel 2, the front left wheel is defined as the loose wheel 1, and the back wheel is defined as the steering wheel 20. FIG.

5 shows a state of turning left substantially in a forward movement. A cross point of an axis A of the front wheels and an axis B of the back wheel is a rotation center O. When the wheelchair turns left, the steering wheel 20 turns substantially such that the rotation center O is positioned slightly to a left of a center of the axis A of the front wheels. Because the rotation center O is positioned at a left side of the steering wheel 20, the wheelchair can turn when the pedal 50 is stepped. At this time, the right driving wheel 2 rotates slightly forward, and the left loose wheel 1 rotates slightly backward. Thereby, the wheelchair can turn in a small radius. The closer to the center of the axis A of the front wheels the rotation point O, the smaller the radius of gyration, like whirling in one spot.

The pedal 50 can rotate forward when the steering wheel 20 turn right substantially such that the wheelchair can turn right. However, the rotation center O cannot be set on the axis A of the front wheels at an inner side of the driving wheel 2, and thus the driving wheel 2 and the rotation center O make it difficult that the wheelchair turns in a small radius. In this case, the pedal 50 should be provided with a relatively large torque, and thus the wheelchair is not adapted to turn in a small radius.

Figure 6:
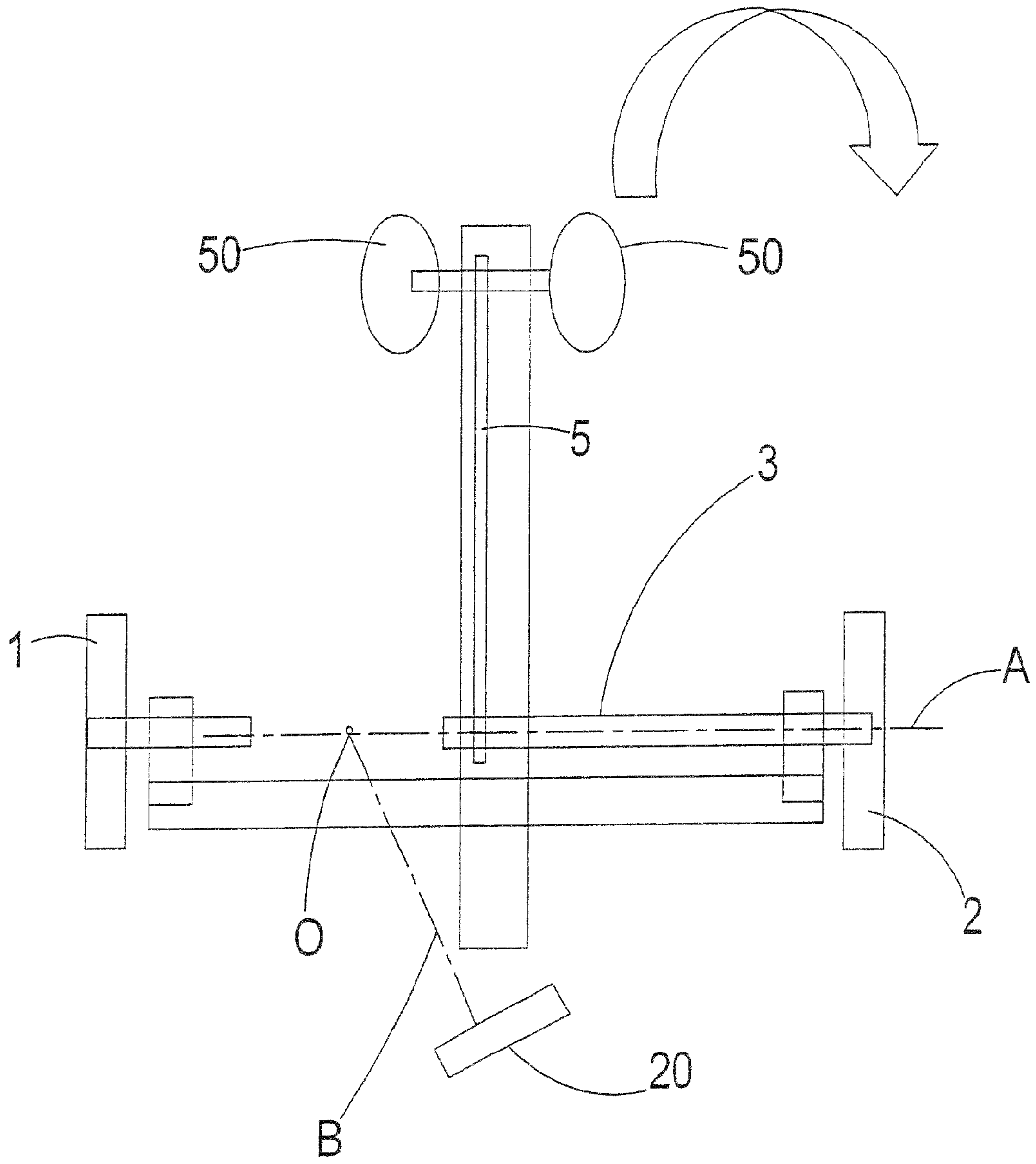
FIG. 6 is a schematic view of an action of turning right in accordance with an embodiment of the present invention.

FIG. 1 is a schematically side view in accordance with an embodiment of the present invention. FIG. 2 is a schematically top view in accordance with an embodiment of the present invention. FIG. 3 is a schematic view of a pedal in accordance with an embodiment of the present invention. FIG. 4 is a schematic view of a strip in accordance with an embodiment of the present invention. FIG. 5 is a schematic view of an action of turning left in accordance with an embodiment of the present invention. FIG. 6 is a schematic view of an action of turning right in accordance with an embodiment of the present invention. Referring to FIG. 6, when the wheelchair turns right, the steering wheel 20 turns left substantially. A cross point of an axis A of the front wheels and an axis B of the back wheel, steering wheel 20, is a rotation center O. At this time, the pedal 50 rotates backward, and thereby the wheelchair turns right. When the steering wheel 20 turns to a large angle, the rotation center O is positioned at a left side of the steering wheel 20 and slightly to a left of a center of the axis A of the front wheels. At this time, the pedal 50 rotating backward leads the right driving wheel 2 to rotates slightly backward and leads the left loose wheel 1 to rotate slightly forward. Thereby, the wheelchair can turn right in a small radius.

Figure 7:
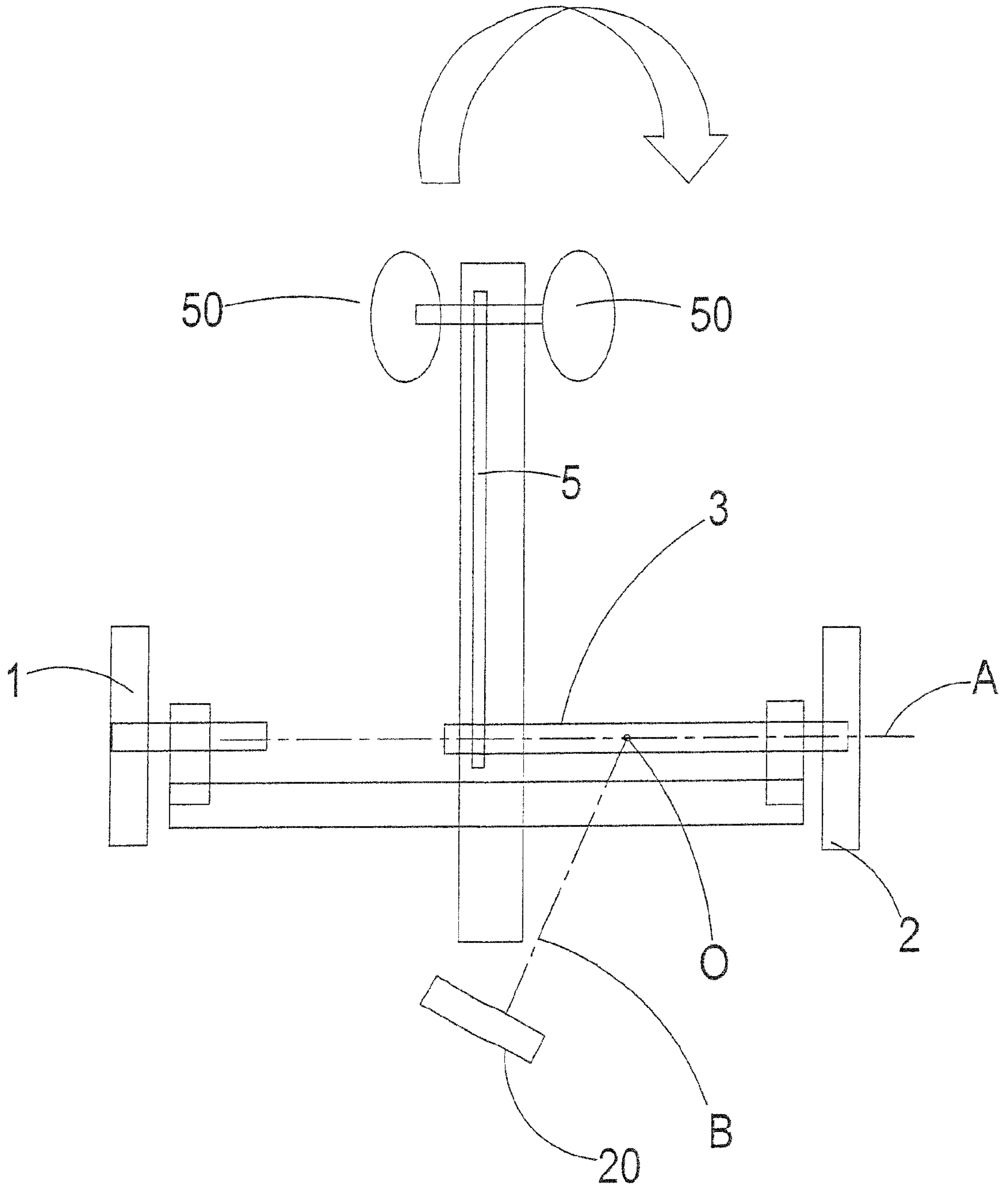
FIG. 7 is a schematic view of an action of turning left in a small radius in accordance with an embodiment of the present invention.

FIG. 1 is a schematically side view in accordance with an embodiment of the present invention. FIG. 2 is a schematically top view in accordance with an embodiment of the present invention. FIG. 3 is a schematic view of a pedal in accordance with an embodiment of the present invention. FIG. 4 is a schematic view of a strip in accordance with an embodiment of the present invention. FIG. 5 is a schematic view of an action of turning left in accordance with an embodiment of the present invention. FIG. 6 is a schematic view of an action of turning right in accordance with an embodiment of the present invention. FIG. 7 is a schematic view of an action of turning left in a small radius in accordance with an embodiment of the present invention. FIG. 7 illustrates turning right in a small radius, like whirling in one spot when the wheelchair moves forward in a speed of about 1 Km. This can be achieved by the steering wheel 20 turning right substantially and at the beginning the pedal 50 rotating backward substantially. Because a cross point of an axis A of the front wheels and an axis B of the back wheel is a rotation center O that is positioned at a left side of the driving wheel 2 and at a right side of the steering wheel 20. Accordingly, in this embodiment, the wheelchair can turn in a small radius, like whirling in one spot, and this can be performed by an auxiliary power supplied by the motor 48 so that the loading of stepping the pedal 50 can be reduced.

Illustrative embodiments accompanying with figures are above described but addition, modification or replacement applied to the embodiments of the present invention is within the scope of the claims. The skilled in the art would understand the invention can be realized with modification of multiple structures, arrangements, proportions and elements.

The present invention has following advantages:

1. In accordance with the present invention, the armrest 30 capable of moving backward leads a handicap with a need of rehabilitation to easily get on or off the wheelchair and the wheelchair may have a reduced size.
2. In accordance with the present invention, multiple strips 65 compose the seat and backrest and thus the wheelchair has a comfortable seat. Accordingly, the handicap when rehabilitating feels like riding a bicycle.
3. In accordance with the present invention, the driving wheel 2 can coordinate with the steering wheel 20 such that the wheelchair can turn in a small radius, like whirling in one spot. Accordingly, the wheelchair not only is beneficial for rehabilitation but turns in a small radius, not worse than hand push wheelchair. Thereby, it is possible for a handicap to physically and psychologically build up self-confidence.
4. In accordance with the present invention, because of the wheelchair free to move, the loading of caring a handicap can be expected to be reduced and a bedridden status can be expected to be avoided.
5. In accordance with the present invention, the roller supporting bodies 27 and the rod 17 for preventing the wheelchair from turning over, a user can be secured to rehabilitate or move. In family, the wheelchair can be used as a chair free to move for a healthy person, and as a healthy apparatus for training feet.
6. In accordance with the present invention, the wheelchair has a simple structure and can be made by mass production.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

We claim:

1. A three-wheel pedal-style wheelchair comprising:

two front wheels respectively arranged at two opposite sides of the wheelchair, wherein the two front wheels comprise a driving wheel led to rotate forward or backward by a user stepping and a loose wheel; and a steering wheel arranged at a side of the wheelchair for controlling steering;

wherein when the wheelchair turns in a small radius of 180 degrees or to another direction, the steering wheel is considerably rotated to a direction and the driving wheel is rotated forward such that the steering wheel and the driving wheel can rotate simultaneously, wherein when the wheelchair turns to another direction, the steering wheel is considerably rotated to another direction and the driving wheel is rotated backward such that the steering wheel and the driving wheel can rotate simultaneously;

further comprising a support device, a bifurcate arm arranged on the support device, a longitudinal operating rod arranged on the bifurcate arm and a lateral operating arm arranged on the bifurcate arm, wherein the longitudinal operating rod and lateral operating arm capable of rotating horizontally together connect with an operating plate such that a rotation of the longitudinal operating rod and lateral operating arm can be transmitted to the operating plate, wherein the operating plate is arranged with a pair of steel cables connecting to a back-wheel support shaft at a back-wheel support portion, wherein the back-wheel support shaft connects with the steering wheel, wherein a rotary force of the steel cables can be multiplied and transmitted to the back-wheel support shaft such that the steering wheel can be controlled to turn left or right.

2. The wheelchair of claim 1 further comprising a roller at a side, close to the ground, of the wheelchair, wherein the roller prevents the wheelchair from turning over.

3. The wheelchair of claim 1 further comprising at least a pedal configured to be stepped by the user, wherein the pedal comprises a planar foot-placing portion, a front foot-placing portion expanding forward from a side of the foot-placing portion, a base portion provided at a side of the foot-placing portion and with mounting holes, a heel-placing portion at a side, far away from the front foot-placing portion, of the foot-placing portion, and a foot strip provided with a hook-and-loop fastener.

4. The wheelchair of claim 1, wherein the back-wheel support portion is arranged with at least a caliper, the longitudinal operating rod is arranged with at least a brake rod, and the steering wheel is arranged with a disk, wherein the brake rod when being held leads the steel cables to tighten the caliper, wherein a position and inclined degree of the caliper can be controlled to lead a brake force created in backward movement to be greater than that created in forward movement.

5. The wheelchair of claim 1 further comprising a motor for supplying auxiliary power to the driving wheel when the wheelchair turns in a small radius.

6. The wheelchair of claim 2 further comprising a motor for supplying auxiliary power to the driving wheel when the wheelchair turns in a small radius.

7. The wheelchair of claim 3 further comprising a motor for supplying auxiliary power to the driving wheel when the wheelchair turns in a small radius.

8. The wheelchair of claim 1 further comprising a motor for supplying auxiliary power to the driving wheel when the wheelchair turns in a small radius.

9. The wheelchair of claim 4 further comprising a motor for supplying auxiliary power to the driving wheel when the wheelchair turns in a small radius.

* * * * *